W. A. OUBRIDGE.
HAND TRUCK FOR LIFTING AND TRANSPORTING LOADS.
APPLICATION FILED AUG. 6, 1917.

1,329,995.

Patented Feb. 3, 1920.
2 SHEETS—SHEET 1.

WITNESSES.

INVENTOR.

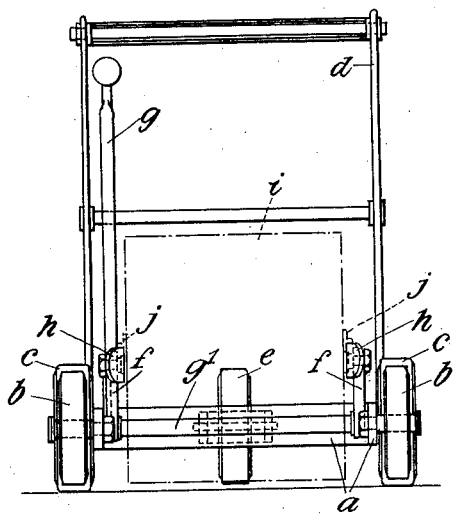
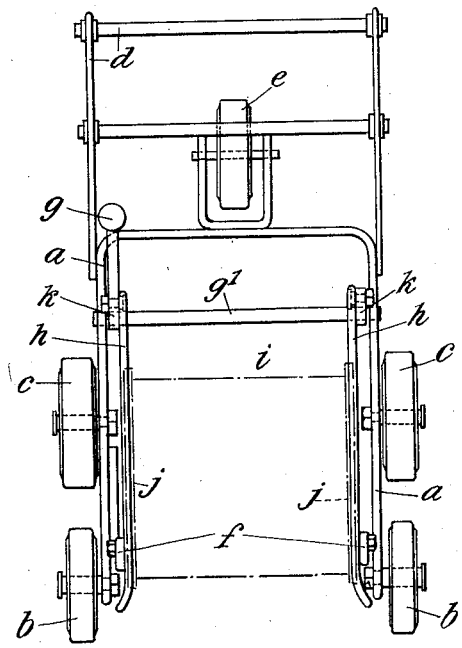

UNITED STATES PATENT OFFICE.

WILLIAM ARTHUR OUBRIDGE, OF COVENTRY, ENGLAND.

HAND-TRUCK FOR LIFTING AND TRANSPORTING LOADS.

1,329,995.   Specification of Letters Patent.   Patented Feb. 3, 1920.

Application filed August 6, 1917. Serial No. 184,656.

*To all whom it may concern:*

Be it known that I, WILLIAM ARTHUR OUBRIDGE, a subject of the King of Great Britain and Ireland, and residing at "Clovelly," Stoney Lane, Coventry, in the county of Warwick, England, have invented Improved and Useful Hand-Trucks for Lifting and Transporting Loads, and of which the following is a specification.

This invention relates to hand trucks of the kind used in spanning and lifting from the ground or floor on which they rest, loads, receptacles or the like, that have ledges or other projections on two of their opposite approximately vertical sides, and then transporting such loads along the ground or floor, and the chief object of the invention is the provision whereby such loads may be lifted and transported easily and expeditiously without the necessity for raising them more than is sufficient to cause them to clear the said ground or floor during transportation.

According to this my invention I employ a means for lifting and transporting loads in which a supporting member or a pair of supporting members lying in a horizontal plane and adapted to move upward or downward, spans or span the load during the lifting and transporting operations, the said load being supported upon the said supporting member or members by means of ledges or projections on the sides of the load or load holder.

In a suitable means for carrying out my invention I preferably use a hand-truck mechanism of the kind in which an upwardly and downwardly movable supporting member is connected to the body of the truck by parallel radius-bars which when turned together about their pivots cause the said member to rise or fall and, according to this invention, a pair of such supporting members are arranged upon the truck-frame so that they, as well as the said truck-frame or body, span the load in order that the ledges or projections, on opposite sides of the load or its holder, may rest upon the said supporting members while being lifted or transported.

Further objects of the invention are the provision of an improved construction of the radius-bar turning means and a wheel-base designed to facilitate the movement and guidance of the truck.

In order that this my invention may be readily understood, the following is a description of a preferred embodiment of the same; reference being had to the accompanying drawings of which—

Fig. 2 is a front view,

Fig. 3 is a plan view and

Figure 1:
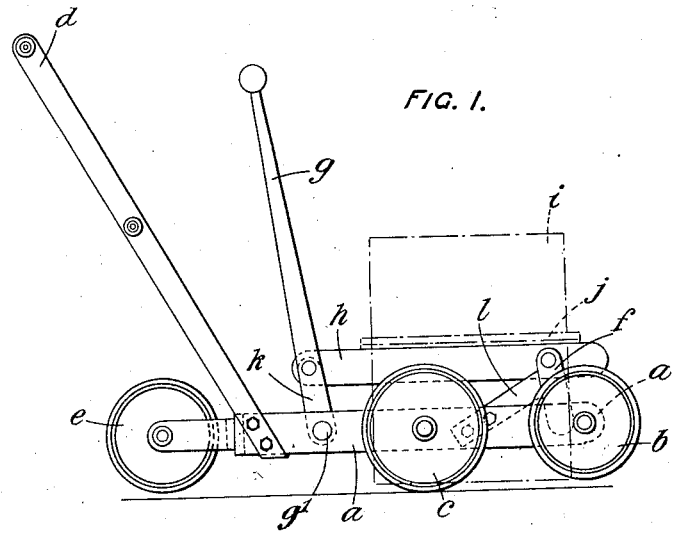
Figure 1 is a side view.
Figure 4:
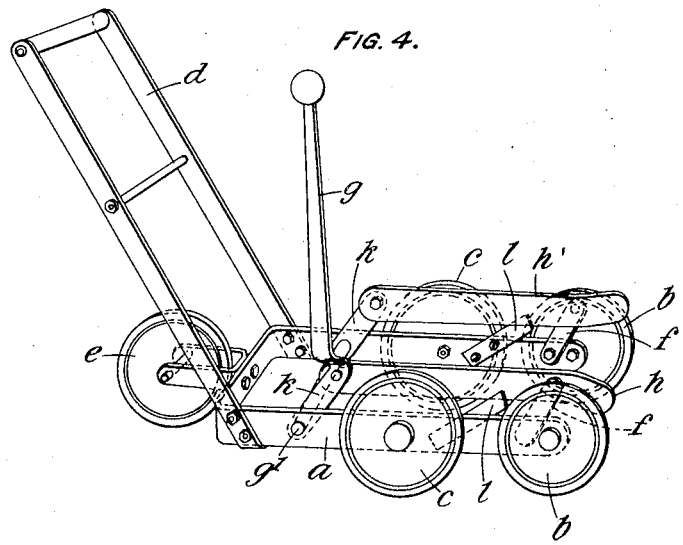

Fig. 4 a perspective view of a hand truck constructed according to my said invention.

In these figures, a U-shaped horizontal frame or body $a$ is shown as having mounted on each leg subsidiary and main wheels $b$ and $c$ respectively, each having its axis in a horizontal plane at right angles to the leg. These wheels are mounted on short axles each having a shoulder and a screwed small end that rests in a hole in the frame with the shoulder against the outer side thereof and is there retained by a nut on the said small end which clamps the frame between it and said shoulder. To the closed end of the frame is attached a means by which the truck and its load may be moved, for example a fixed transverse handle $d$ is shown bolted at its ends to legs of the frame near its rear end. Preferably also a wheel $e$ is provided at the rear of the closed end of the frame for preventing the overturning of a load rearward. This wheel is shown mounted on a fixed axle carried by a bracket, the said axle being long enough to allow the wheel $e$ and axle to slide relatively one to the other should the said wheel $e$ touch the ground while the truck is being turned.

Mounted on the legs of the frame $a$ and connected to them by rock-shaft $g'$ and radius-bars $k$, $k$ and $f$, $f$ are bars $h$ adapted to lie parallel with the said legs and to be raised or lowered when a lever $g$, which is an extended radius-bar the handle of which before the load is raised, is well forward of the rock-shaft axis to allow a long upward and rearward pull, is operated for this purpose. The radius-bars $k$, $k$ are each rigidly fixed at one end to the rock-shaft $g'$ which turns in bearings in the legs of the frame $a$, the other ends being pivoted to the rear ends of the parallel bars $h$, $h$, while the fore ends of the said parallel bars $h$, $h$ are pivoted to the upper ends of the radius bars $f$, $f$ which at their lower ends are pivoted near the fore ends of the legs of the said truck-frame $a$.

In use, the open end of the U-shaped frame $a$ is placed so that the legs thereof and the bars $h$, $h$ span the load to be transported. If the load carrier or container be a box $i$, for example, a cleat or ledge $j$ is fastened to opposite sides of it so that when the frame spans the box, the bars $h$, $h$ parallel with the frame $a$ and in their lowest position, will be just below the said ledges or cleats. The lever $g$ is then turned upon its rock-shaft $g'$, so as to cause the radius-bars $k$, $k$ which are secured to the said shaft and the radius-bars $f$, $f$ which are attached to the radius-bars $k$, $k$ by means of the parallel bars $h$, $h$, to swing about their respective pivots with the effect that the said bars $h$, $h$, rise parallel to the frame $a$, and engaging the ledges $j$, $j$, raise the load clear of the ground or floor. When the radius-bars $f$ $f$ have just passed the vertical line or "dead center," they arrive against stops, $l$, $l$ bolted on the truck frame legs the load being thereby maintained in its raised position. The middle wheels $c$ $c$ are of larger diameter than the wheels $b$ to facilitate the turning of the truck, which, when the wheels $b$, $b$ are raised by depressing the handle $d$, is supported only on the said wheels $c$, $c$.

In Fig. 4, the lever $g$ is cranked so as to stand vertical when in its forward position, in order to avoid loads overhanging the parallel bars $h$, $h$ and it is also cranked or offset transversely of the truck in order that it may not foul the handle $d$ when drawn rearward.

I claim:

1. In a hand truck, in combination, a truck-frame adapted to span the load, parallel load supporting bars above said truck-frame also adapted to span the load, two pairs of parallel coöperating radius bars pivoted to said truck-frame and to said load supporting bars, a rock-shaft journaled transversely of said truck-frame, a pair of said radius bars fixed on said rock-shaft, a rigid entire hand-power arm made integral with a radius bar and having its handle part 25 to 30 degrees forward of the vertical when the load supporting bars are in their lowermost position, means on said truck-frame for retaining said radius bars approximately in their uppermost position, means on said truck-frame for facilitating movement of the hand-truck on the ground and means whereby said truck may be propelled, substantially as described.

2. In a hand-truck, in combination, a truck-frame adapted to span the load, parallel load supporting bars above said truck-frame also adapted to span the load, two pairs of parallel coöperating radius-bars pivoted to said truck-frame and to said load supporting bars, main wheels journaled transversely of said frame near the center of gravity thereof when loaded, and a rearwardly projecting overturn-preventing wheel parallel to said truck frame and adapted to move along its axle, said axle being also arranged transversely of said truck-frame, substantially as described.

3. A hand-truck comprising, in combination, a U-shaped truck-frame, a pair of parallel load supporting bars carried above said truck-frame, two pairs of parallel radius bars above said truck-frame and pivoted thereto and to said load supporting bars, a transverse rock-shaft rigidly secured to one pair of said radius-bars and mounted on said truck-frame, a rigid leverage-increasing handle on one of said radius-bars, stops secured to said truck-frame sides and adapted to retain said radius-bars in their uppermost position, a transverse handle secured at each of its ends to the rear of said truck-frame, a main pair of running-wheels secured to said truck-frame beneath and near the center thereof, a pair of subsidiary running-wheels secured to said truck-frame forward of said main wheels and an overturn-preventing axially-movable wheel journaled near the center of the rear of said truck-frame, all substantially as described and for the purposes set forth.

WILLIAM ARTHUR OUBRIDGE.